United States Patent
Asagiri et al.

(10) Patent No.: US 9,333,674 B2
(45) Date of Patent: May 10, 2016

(54) KNEADING/EXTRUDING EQUIPMENT WITH FEEDFORWARD CONTROL OF LATTER STAGE PUMP

(71) Applicant: Kabushiki Kaisha Kobe Seiko Sho (Kobe Steel, Ltd.), Kobe-shi (JP)

(72) Inventors: Shinichi Asagiri, Takasago (JP); Satoshi Abe, Takasago (JP); Shin Iwasaki, Takasago (JP); Yoshinori Kuroda, Takasago (JP); Kazuo Iritani, Takasago (JP); Kayoko Minami, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 629 days.

(21) Appl. No.: 13/759,448

(22) Filed: Feb. 5, 2013

(65) Prior Publication Data

US 2013/0229888 A1 Sep. 5, 2013

(30) Foreign Application Priority Data

Mar. 5, 2012 (JP) ................................. 2012-048165

(51) Int. Cl.
*B29C 47/36* (2006.01)
*B29B 7/80* (2006.01)
(Continued)

(52) U.S. Cl.
CPC . *B29B 7/80* (2013.01); *B29B 7/726* (2013.01); *B29B 7/728* (2013.01); *B29C 47/364* (2013.01);
(Continued)

(58) Field of Classification Search
CPC .............. B29B 7/72; B29B 7/18; B29B 7/28; B29B 7/88; B29B 7/726; B29B 7/728; B29B 7/80; B29C 47/364; B29C 47/367; B29C 47/6056; B29C 47/92; B29C 47/369; B29C 47/38; B29C 47/0871; B29C 47/686; B29C 2947/92514; B29C 2947/9259; B29C 47/70

USPC ................ 366/142, 189, 192, 194–196, 76.1, 366/76.2, 76.7, 76.8, 76.93, 77; 425/204, 425/208, 209

See application file for complete search history.

(56) References Cited

U.S. PATENT DOCUMENTS 4,171,193 A * 10/1979 Rahlfs ..................... B29C 47/38
264/40.7
4,213,747 A * 7/1980 Friedrich .............. B29C 47/367
264/211.12

(Continued)

FOREIGN PATENT DOCUMENTS

DE 198 03 362 A1 8/1999
JP 6-55415 * 7/1994
(Continued)

OTHER PUBLICATIONS

Machine translation of JP2003-001696AT.*
(Continued)

*Primary Examiner* — Charles Cooley
(74) *Attorney, Agent, or Firm* — Oblon, McClelland, Maier & Neustadt, L.L.P.

(57) ABSTRACT

The present invention provides kneading/extruding equipment capable of stable operation by keeping the pressure of kneaded material before a first-stage gear pump in steady operation (molding) and preventing fluctuation of the pressure of kneaded material before the first-stage gear pump constant from largely affecting the pressure of kneaded material before a latter-stage gear pump at start-up or upon change of production rate, and thus capable of responding to an increase in production rate while securing a high-quality molded product, and an operation control method thereof. The kneading/extruding equipment comprises: a rotational speed feedback control unit for a first gear pump, which feedback-controls the rotational speed of the first gear pump, and a rotational speed feedforward control unit for a second gear pump, which feedforward-controls the rotational speed of the second gear pump.

14 Claims, 5 Drawing Sheets

(51) Int. Cl.
  *B29B 7/72*  (2006.01)
  *B29C 47/92*  (2006.01)
  *B29C 47/38*  (2006.01)
  *B29C 47/60*  (2006.01)
  *B29C 47/08*  (2006.01)
  *B29C 47/68*  (2006.01)
  *B29C 47/70*  (2006.01)

(52) U.S. Cl.
  CPC ............. *B29C 47/367* (2013.01); *B29C 47/369* (2013.01); *B29C 47/38* (2013.01); *B29C 47/6056* (2013.01); *B29C 47/92* (2013.01); *B29C 47/0871* (2013.01); *B29C 47/686* (2013.01); *B29C 47/70* (2013.01); *B29C 2947/9259* (2013.01); *B29C 2947/92514* (2013.01)

(56) References Cited

U.S. PATENT DOCUMENTS

| | | | | |
|---|---|---|---|---|
| 5,191,537 A * | 3/1993 | Edge | ........................ | B29B 7/72 366/132 |
| 6,726,465 B2 * | 4/2004 | Groleau | ................. | B29C 45/46 366/190 |
| 2002/0065330 A1 | 5/2002 | Klotzer | | |
| 2002/0091169 A1 | 7/2002 | Klotzer | | |
| 2004/0032040 A1 * | 2/2004 | Harris | ................... | B29C 47/364 264/40.1 |
| 2004/0247731 A1 | 12/2004 | Kobayashi | | |
| 2013/0229888 A1 * | 9/2013 | Asagiri | ................... | B29B 7/726 366/77 |

FOREIGN PATENT DOCUMENTS

| | | |
|---|---|---|
| JP | 10-329200 A | 12/1998 |
| JP | 2000-345423 A | 12/2000 |
| JP | 2001-30338 A | 2/2001 |
| JP | 2003-1696 A | 1/2003 |
| JP | 2003-62891 A | 3/2003 |
| JP | 2006-35457 A | 2/2006 |
| JP | 3889941 | 12/2006 |

OTHER PUBLICATIONS

Machine translation of JP2003-062891A.*
Machine translation of JP2000-345423A.*
Extended European Search Report Issued Jul. 12, 2013 in Patent Application No. 13153985.0.

* cited by examiner

KNEADING/EXTRUDING EQUIPMENT WITH FEEDFORWARD CONTROL OF LATTER STAGE PUMP

BACKGROUND OF THE INVENTION

1. Field of the Invention

The present invention relates to kneading/extruding equipment and an operation control method thereof.

2. Description of the Related Art

As the kneading/extruding equipment, for example, a resin extruder as shown in Japanese Patent No. 3889941 is known.

The resin extruder described in the above-mentioned bulletin comprises: a raw material feeder; an extruding machine for extruding raw material from the raw material feeder while kneading and melting it; and serially-arranged first (first-stage) and second (latter-stage) gear pumps for discharging resin as a kneaded material extruded by the extruding machine.

An operation control device in this resin extruder comprises a first filtering device provided between the first-stage gear pump and the latter-stage gear pump, a second filtering device provided on the discharge side of the first-stage gear pump, a first feedback control means used in molding, and a second feedback control means used at start-up and in change of discharge rate.

The first feedback control means is configured to set the rotational speed of the latter-stage gear pump to a set speed and feedback-control the speeds of the raw material feeder, the extruding machine and the first-stage gear pump so that the pressure before the latter-stage gear pump becomes a set pressure.

The second feedback control means is configured to feedback-control the speeds of the first-stage and latter-stage gear pumps respectively so that the pressures before the gear pumps become set pressures and further to feedback-control, when the speed of the latter-stage gear pump reaches a set speed, the raw material feeder, the extruding machine and the first-stage gear pumps while keeping the speed of the latter-stage gear pump at this set speed.

However, the above-mentioned related art has the following problems.

1) Since the speeds of the raw material feeder and the extruding machine are changed during control, in the feedback control from the latter-stage gear pump, the kneaded or mixed state of resin in the extruding machine is greatly varied due to a slow response to a change of condition in the upstream, resulting in a prolonged time to a uniformed product quality (or, leading also to a material loss).

2) When the speeds of the raw material feeder and the extruding machine are feedback-controlled so that the resin pressure before the latter-stage gear pump becomes constant in steady operation (molding), the response rate of the resin pressure control to the change of condition in the upstream is reduced. As a result, the resin pressures before the first-stage and latter-stage gear pumps can exceed mechanical design pressures due to enhanced fluctuations of the resin pressures to damage devices before the first-stage and latter-stage gear pumps and the respective gear pumps.

3) When the switching from the control method in change of discharge rate to the control method in steady operation is performed at start-up, stable operation switching can not be performed since the whole control system becomes unstable to enhance the fluctuations of the resin pressures before the respective gear pumps.

4) When the resin extruder is increased in size to respond to an increase in production rate, the above-mentioned problems of 1) and 3) become more significant since it takes time to accelerate/decelerate this resin extruder and the pressure before the latter-stage gear pump increasingly becomes unstable.

SUMMARY OF THE INVENTION

In consideration with the above-mentioned problems, the present invention has an object to provide kneading/extruding equipment, capable of stable operation by keeping the pressure of kneaded material before a first-stage gear pump constant in steady operation (molding) and preventing fluctuation of the pressure of kneaded material before the first-stage gear pump from largely affecting the pressure of kneaded material before a latter-stage gear pump at start-up or upon change of production rate, and thus capable of responding to an increase in production rate while securing a high-quality molded product, and an operation control method thereof.

In order to solve the above-mentioned problems, kneading/extruding equipment according to the present invention comprises: a raw material feeder; an extruding machine which kneads and extrudes raw material supplied from the raw material feeder; a first-stage gear pump for pressure-raising the kneaded material, the gear pump being provided on the downstream side of the extruding machine; a pressure loss generation device through which the kneaded material discharged from the first-stage gear pump is passed and which causes a pressure loss in the kneaded material during the passing; a latter-stage gear pump for pressure-raising the kneaded material discharged from the pressure loss generator; a first-stage variable-speed motor for driving the first-stage gear pump; a latter-stage variable-speed motor for driving the latter-stage gear pump; a first-stage pressure sensor for detecting a pressure of kneaded material on the inlet side of the first-stage gear pump; and a control device which controls the rotational speed of the first-stage gear pump through the first-stage variable-speed motor and controls the rotational speed of the latter-stage gear pump through the latter-stage variable-speed motor, wherein the control device comprises: a rotational speed feedback control unit for the first-stage gear pump, which feedback-controls the rotational speed of the first-stage gear pump so that a pressure value output from the first-stage pressure sensor is conformed to a predetermined first-stage pressure set value; and a rotational speed feedforward-control unit for the latter-stage gear pump, which feedforward-controls the rotational speed of the latter-stage gear pump based on a signal in the rotational speed feedback control unit for the first-stage gear pump.

The kneading/extruding equipment having the above-mentioned structure may further comprise a latter-stage pressure sensor for detecting a pressure of kneaded material on the inlet side of the latter-stage gear pump, and the control device may further comprise a rotational speed feedback control unit for the latter-stage gear pump, which feedback-controls the rotational speed of the latter-stage gear pump so that a pressure value output from the latter-stage gear pump is conformed to a predetermined latter-stage pressure set value, so that the rotational speed of the latter-stage gear pump is controlled by combining an output of the rotational speed feedforward control unit for the latter-stage gear pump and an output of the rotational speed feedback control unit for the latter-stage gear pump.

In the kneading/extruding equipment having the above-mentioned structure, the rotational speed feedforward control unit for the latter-stage gear pump may perform the control by use of a manipulation amount signal generated by the rotational speed feedback control unit for the first-stage gear pump.

In the kneading/extruding equipment having the above-mentioned structure, the rotational speed feedforward control unit for the latter-stage gear pump may perform the control by use of a pressure value output from the first-stage pressure sensor.

In the kneading/extruding equipment having the above-mentioned structure, a PID control based on a deviation between the pressure value output from the first-stage pressure sensor and the predetermined first-stage pressure set value may be performed in the rotational speed feedback control unit for the first-stage gear pump.

In the kneading/extruding equipment having the above-mentioned structure, a PID control based on a deviation between the pressure value output from the latter-stage pressure sensor and the predetermined latter-stage pressure set value may be performed in the rotational speed feedback control unit for the latter-stage gear pump.

The kneading/extruding equipment having the above-mentioned structure may further comprise a third-stage gear pump provided on the downstream side of the latter-stage gear pump across a further pressure loss generation device from, and the control device may further comprise a rotational speed feedforward control unit for the third-stage gear pump, which feedforward-controls the rotational speed of the third-stage gear pump based on a signal in the rotational speed feedback control unit for the latter-stage gear pump.

An operation control method of kneading/extruding equipment which uses the control device having the above-mentioned structure to perform control also falls into the scope of the present invention.

The kneading/extruding equipment of the present invention can perform stable operation by keeping the pressure of kneaded material before the first-stage gear pump constant in steady operation (molding) and preventing, at start-up or upon change of production rate, fluctuation of the pressure of kneaded material before the first-stage gear pump from largely affecting the pressure of kneaded material before the latter-stage gear pump, and thus can respond to an increase in production rate while securing a high-quality molded product.

BRIEF DESCRIPTION OF THE DRAWINGS

FIGS. 1A and 1B are views for illustrating kneading/extruding equipment according to a first embodiment of the present invention, wherein

FIGS. 2A and 2B are views for illustrating kneading/extruding equipment according to a second embodiment of the present invention, wherein

FIGS. 3A and 3B are views for illustrating kneading/extruding equipment according to a third embodiment of the present invention, wherein FIGS. 4A and 4B are views for illustrating kneading/extruding equipment according to a fourth embodiment of the present invention, wherein

DESCRIPTION OF THE PREFERRED EMBODIMENTS

Hereinafter, embodiments of the present invention will be described in reference to the drawings.

[First Embodiment]

Figure 1A:
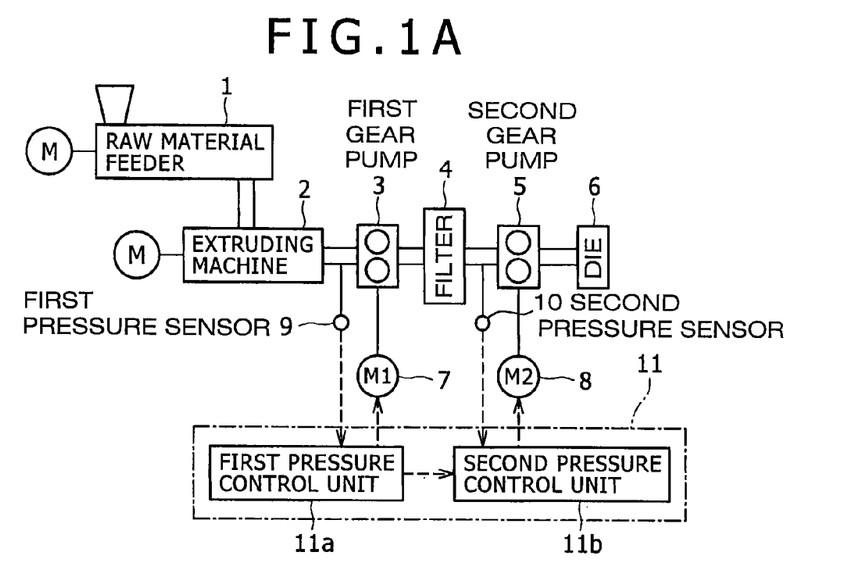
FIG. 1A is a block view showing the equipment.
Figure 1B:
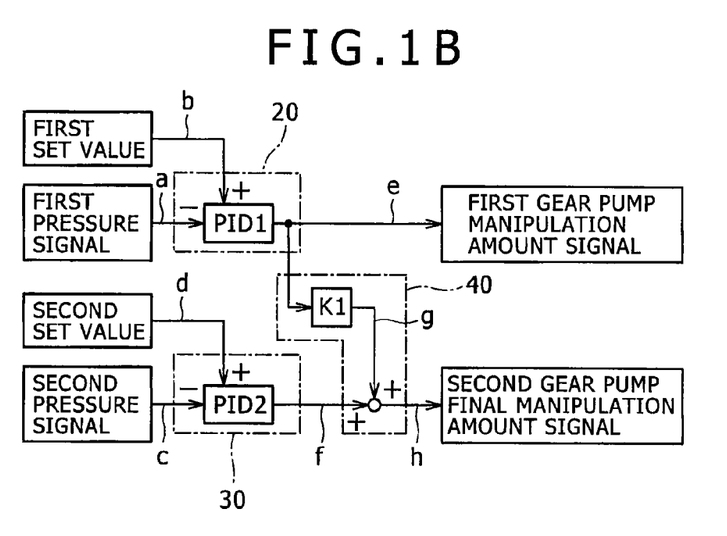
FIG. 1B is a control block diagram thereof.

FIGS. 1A and 1B are view for illustrating kneading/extruding equipment according to a first embodiment, wherein FIG. 1A is a block view showing the equipment and FIG. 1B is a control block diagram thereof.

In FIG. 1A, the kneading/extruding equipment comprises: a raw material feeder 1; an extruding machine 2 which kneads and extrudes raw material supplied from the raw material feeder 1; a first gear pump 3 as a first-stage gear pump for pressure-raising the kneaded material (e.g., resin) extruded from the extruding machine 2; a device 4 which causes, upon passing of the kneaded material discharged from the first gear pump 3 therethrough, a pressure loss in the kneaded material (e.g., a filtering device); a second gear pump 5 as a latter-stage gear pump for pressure-raising the kneaded material with the pressure loss which is discharged from the filtering device 4; and an extrusion molding die 6 for molding, to which the kneaded material discharged from the second gear pump 5 is supplied. The respective speeds in steady operation of the raw material feeder 1 and the extruding machine 2 are held at predetermined speeds according to a production rate. Each of the raw material feeder 1 and the extruding machine 2 is driven by a motor, and at start-up or upon change of production rate, the speed thereof, in other words, the feed rate of raw material or the extrusion amount of kneaded material from the extruding machine is adjusted according to the rotational speed of each motor.

The kneading/extruding equipment of the present invention is provided with a first variable-speed motor 7 as a first-stage variable-speed motor for driving the first gear pump 3; a second variable-speed motor 8 as a latter-stage variable-speed motor for driving the second gear pump 5; a first pressure sensor 9 as a first-stage pressure sensor for detecting a pressure of kneaded material on the inlet side of the first gear pump 3; a second pressure sensor 10 as a latter-stage pressure sensor for detecting a pressure of kneaded material on the inlet side of the second gear pump 5; and a control device 11 which drive-controls the first gear pump 3 through the first variable-speed motor 7 and drive-controls the second gear pump 5 through the second variable-speed motor 8.

The control device 11 comprises a first pressure control unit 11a which controls the rotational speed of the first gear pump and a second pressure control unit 11b which controls the rotational speed of the second gear pump.

A control operation in the control device 11 is shown in a control block diagram of FIG. 1B. A first pressure signal a and a second pressure signal c are output signals of the first pressure sensor 9 and the second pressure sensor 10 respectively. The first pressure control unit 11a has a first control block 20. The first control block 20 performs, for conforming the first pressure signal a to a first set value b, a PID operation based on a deviation between the first pressure signal a and the first set value b, and generates a manipulation amount signal for the first gear pump 3 (first gear pump manipulation amount signal) e. The second control unit 11b has a second control block 30 and a third control block 40. The second control block 30 performs, for conforming a second pressure signal c to a second set value d, a PID operation based on a deviation between the second pressure signal c and the second set value d and generates an initial manipulation amount signal for the second gear pump 5 (second gear pump initial manipulation amount signal) f. The third control block 40 is a control block added to the second control block 30 in the rotational speed control of the second gear pump. The third control block 40 generates a signal (first gear pump correction manipulation amount signal) g by multiplying a first gear pump manipulation amount signal e by a predetermined gain K1, and generates a manipulation amount signal for the second gear pump 5 (second gear pump manipulation amount signal) h by adding the first gear pump correction manipulation amount signal g to the second gear pump initial manipulation amount signal f.

In this way, with respect to the rotational speed of the first gear pump, a feedback control by the first control block 20 is performed, and with respect to the rotational speed of the second gear pump, a combined control of feedback control by the second control block 30 and feedforward control by the third control block 40 is performed.

The way to determine the first gear pump correction manipulation amount signal g from the first gear pump manipulation amount signal e is not limited to the multiplication by the gain K1. For example, a relationship between the value of the first gear pump manipulation amount signal e and the value of the first gear pump correction manipulation amount signal g is made into a data table and stored in a storage device, whereby the first gear pump correction manipulation amount signal g according to the first gear pump manipulation amount signal e generated in the control block 20 may be determined in reference to this data table. Control parameters in the third control block 40 such as the gain K1 may be experimentally determined and set, or may be automatically set based on a control result (auto-tuning function).

As described above, since a feedback control for the rotational speed of the first-stage gear pump and a combination of feedback control and feedforward control for the rotational speed of the latter-stage gear pump are adopted, stable operation can be performed while keeping, in steady operation (molding), the pressure of kneaded material before the first-stage gear pump constant and preventing, at start-up or upon change of production rate, the fluctuation of the pressure of kneaded material before the first-stage gear pump from largely affecting the pressure of kneaded material before the latter-stage gear pump. Therefore, it can respond to an increase in production rate while securing a high-quality molded product. In more detail, the following function effects are also provided.

1) Since stable operation can be rapidly performed at start-up, upon change of production rate and even in case of disturbance during steady operation, while suppressing the fluctuation of the pressure of kneaded material (resin) before the latter-stage gear pump, the operation can be performed without damages on machines before the gear pumps.

2) Since the switching of the control method is dispensed with in the transition from start-up to stable operation, smooth operation can be performed.

3) Since stable operation can be rapidly attained at start-up and upon change of production rate with reduced delay of the response time of resin pressure control, the loss of raw material can be reduced.

The device which causes a pressure loss is not limited to the filtering device 4, although it has been described in this embodiment. For example, a breaker plate, an orifice or the like can be used also.

Further, although an example in which the extrusion molding die 6 is provided on the discharge side of the second gear pump 5 has been described in this embodiment, for example, a device which causes a pressure loss in kneaded material when the kneaded material is passed therethrough (e.g., a breaker plate, an orifice, etc.) may be used without limitation thereto.

[Second Embodiment]

Figure 2A:
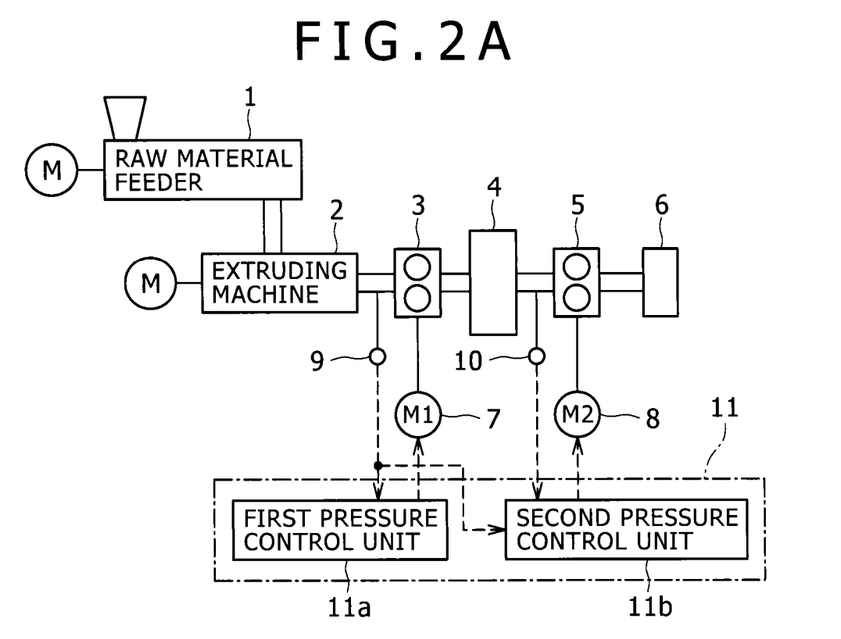
FIG. 2A is a block view showing the equipment and FIG. 2B is a control block diagram thereof.
Figure 2B:
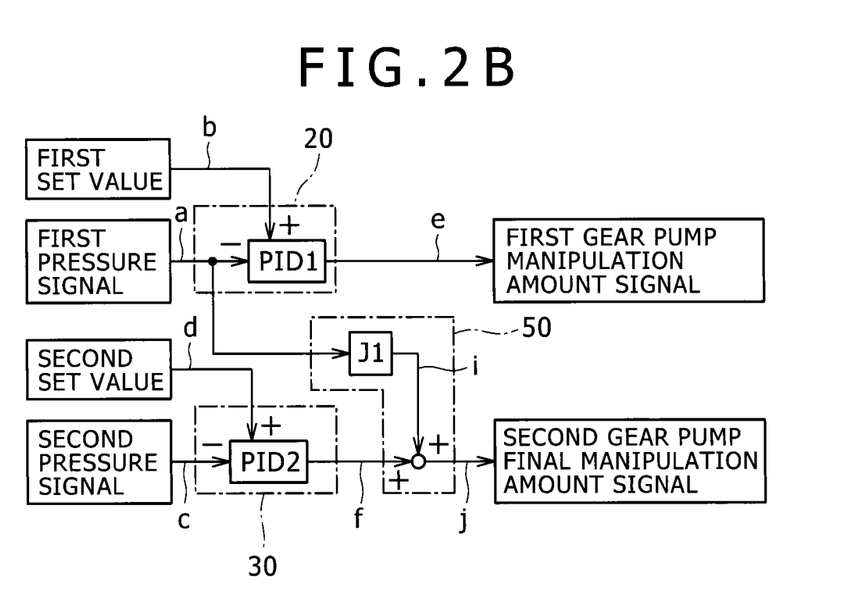

FIGS. 2A and 2B are views for illustrating kneading/extruding equipment according to a second embodiment of the present invention, wherein FIG. 2A is a block view showing the equipment and FIG. 2B is a control block diagram thereof.

In this embodiment, detailed description for the same constituent elements as in the first embodiment is omitted by assigning the same numbers thereto, and only differences will be described in detail.

In this embodiment, as shown in FIG. 2 FIG. 2B, a fourth control block 50 is used instead of the third control block 40 in the first embodiment. The fourth control block 50 generates a signal (first pressure correction signal) i by multiplying a first pressure signal a by a predetermined gain J1, and generates a manipulation amount signal for the second gear pump 5 (second gear pump manipulation amount signal) j by adding the first pressure correction signal i to a second gear pump initial manipulation amount signal f.

In this way, in this embodiment, the first pressure signal a is used as the signal used for the feedforward control of the second gear pump, instead of the first gear pump manipulation amount signal e used in the first embodiment. Therefore, the responsiveness of the pressure control on the kneaded material (resin) before the latter-stage gear pump (second gear pump 5) can be improved. Further, even if the first gear pump manipulation amount signal e is fluctuated, the control of the latter-stage gear pump can be more stably performed since the fluctuation never affects the control of the latter-stage gear pump.

In the generation of the first pressure correction signal i from the first pressure signal a, there could possibly be various modifications similarly to the description in the first embodiment.

[Third Embodiment]

Figure 3A:
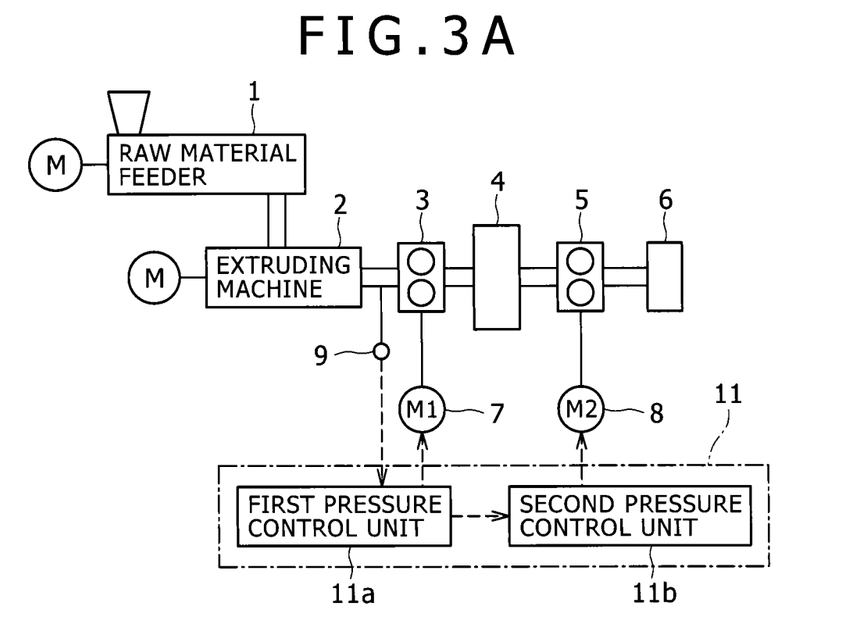
FIG. 3A is a block view showing the equipment and FIG. 3B is a control block diagram thereof.
Figure 3B:
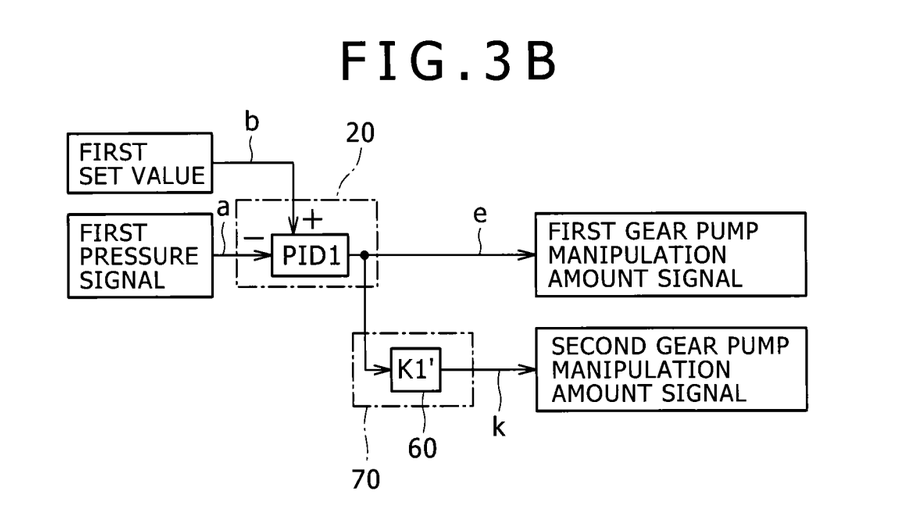

FIGS. 3A and 3B are views for illustrating kneading/extruding equipment according to a third embodiment of the present invention, wherein FIG. 3A is a block view showing the equipment and FIG. 3B is a control block diagram thereof.

In this embodiment, detailed description for the same constituent elements as in the first embodiment is omitted by assigning the same numbers thereto, and only differences will be described in detail.

In this embodiment, as shown in FIG. 3B, only feedforward control is performed without the feedback control in the rotational speed control of the second gear pump in the first embodiment. Namely, instead of the combination of the second control block 30 and the third control block 40 in the rotational speed control of the second gear pump in the first embodiment, only a fifth control block 70 which performs the feedforward control is used. The fifth control block 70 generates a signal by multiplying the first gear pump manipulation amount signal by a predetermined gain K1', and takes this signal as a manipulation amount signal for the second gear pump 5 (second gear pump manipulation amount signal) k. Since such a control is performed on the second gear pump 5, the second pressure sensor 10 is dispensed with in this embodiment as will be noted from FIG. 3A.

Since it is a necessary premise in this embodiment that the second gear pump initial manipulation amount signal f does not take part in the feedback control in the rotational speed control of the second gear pump, the second gear pump manipulation amount signal k in this embodiment is not always determined in the same manner as the first gear pump correction manipulation amount signal g in the first embodiment. Namely, as the gain K1' in the fifth control block, an optimum value for performing the control in this embodiment is used, and this value is not necessarily the same as the gain K1 in the first embodiment.

When the first gear pump and the second gear pump have the same capacity, the first gear pump manipulation amount signal e may be used as the second gear pump manipulation amount signal as it is. Namely, the operation of multiplication by the gain is not performed in the fifth control block 70. In this case, the two pumps of the same capacity are driven at the same rotational speed, whereby the flow of resin can be smoothed, and the control of the pressure on the inlet side of the first gear pump leads to the stabilization of the pressure on the inlet side of the first gear pump.

In this embodiment, although the feedback control is not used in the rotational speed control of the second gear pump, the pressure on the inlet side of the second gear pump can be controlled substantially to a desired value by appropriately setting the gain K1' according to the relationship between the capacity of the first gear pump and the capacity of the second gear pump.

In this embodiment, since the latter-stage gear pump manipulation amount signal (second gear pump manipulation amount signal k) is determined only by the first-stage gear pump manipulation amount signal (first gear pump manipulation amount signal e), not only further stable control can be attained with reduced control delay by the rotational speed feedback control of the latter-stage gear pump, but also the structure of the control means can be further simplified to reduce the cost as the system.

[Fourth Embodiment]

Figure 4A:
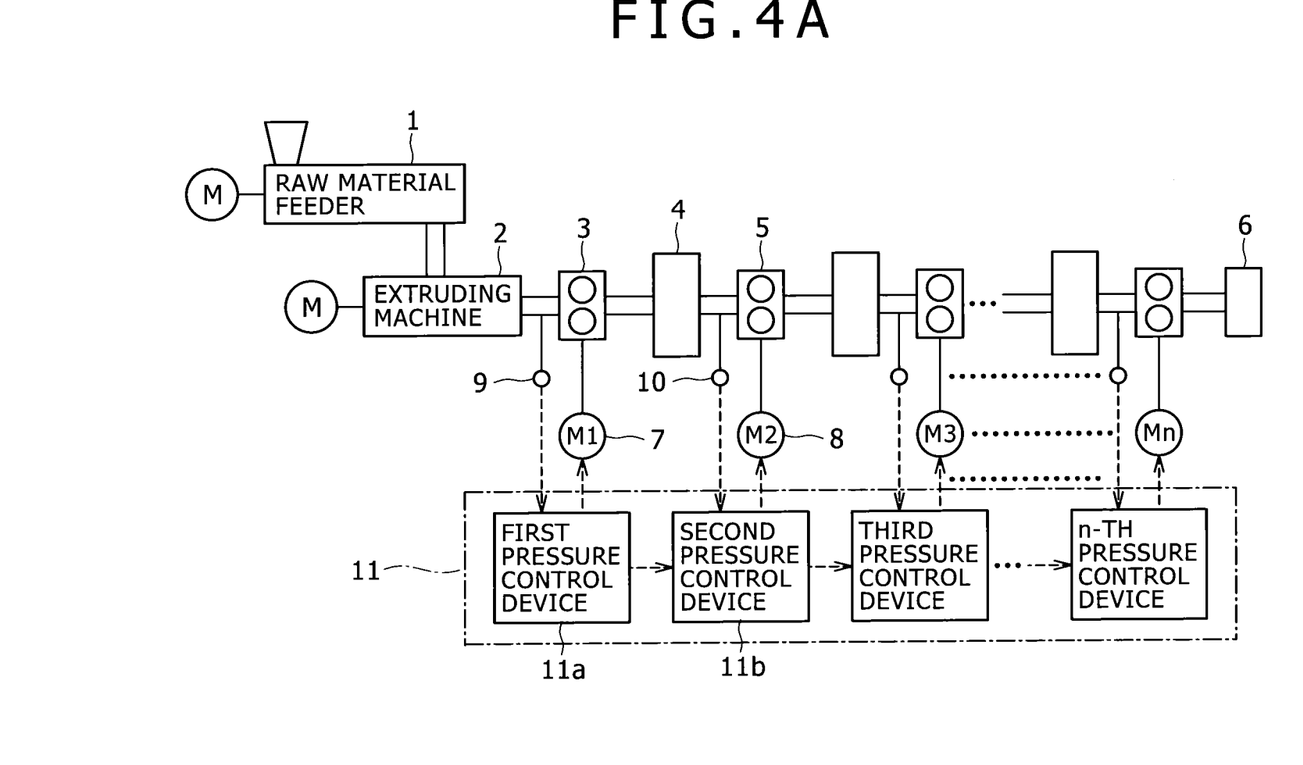
FIG. 4A is a block view showing the equipment and FIG. 4B is a control block diagram thereof.
Figure 4B:
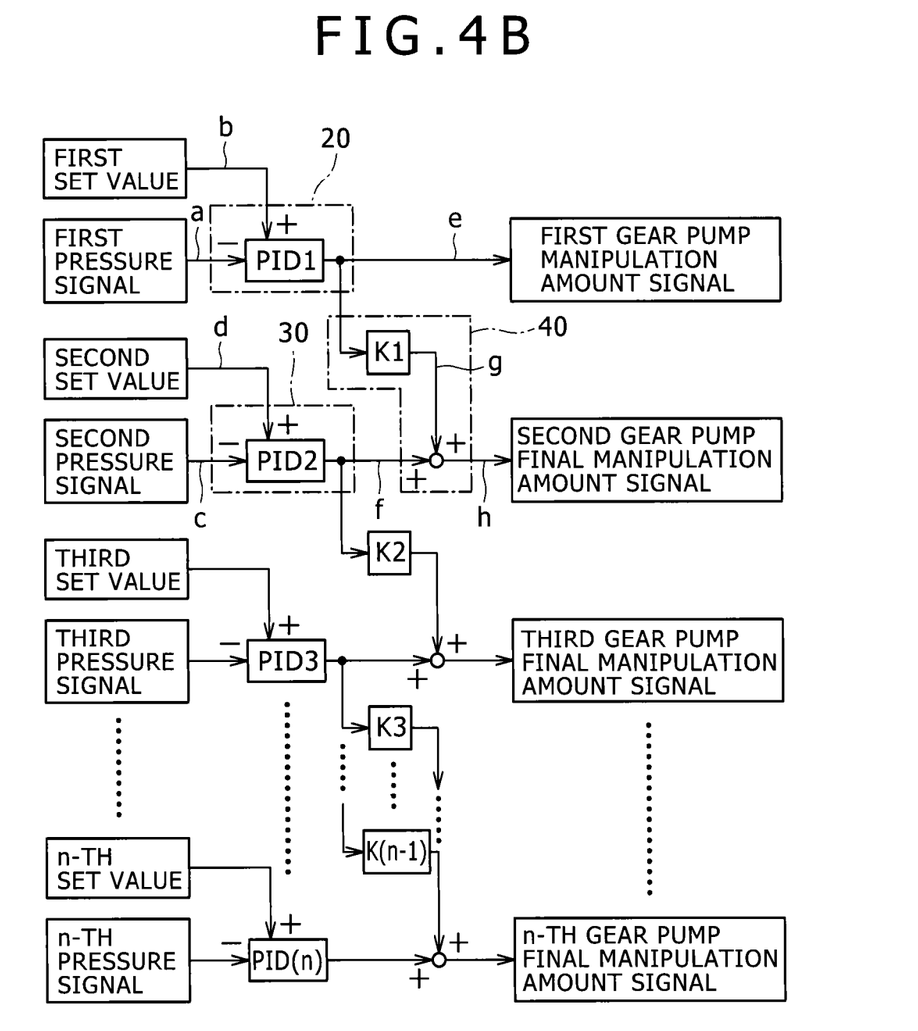

FIGS. 4A and 4B are views for illustrating kneading/extruding equipment according to a fourth embodiment of the present invention, wherein FIG. 4A is a block view showing the equipment and FIG. 4B is a control block diagram thereof.

In this embodiment, detailed description for the same constituent elements as in the first embodiment is omitted by assigning the same numbers thereto, and only differences will be described in detail.

In this embodiment, as shown in FIGS. 4A and 4B, n-stages of gear pumps are successively provided with a pressure loss-generation device (e.g., a filtering device 4) being disposed each in between. The rotational speed controls of the first-stage and second-stage gear pumps are the same as in the first embodiment respectively. The rotational speed control of each of the third-stage to the n-th-stage gear pumps is composed of the same feedback control unit as the second control block 30 and the same feedforward control unit as the third control block 40. Namely, for the rotational speed control of the n-th-stage gear pump, the gear pump initial manipulation amount signal generated by the n-1-th-stage feedback control unit is used.

Since this embodiment is configured so that, even when the n-th stages of gear pumps are successively provided (in a serial multiple manner) with the n-1-th stages of pressure loss-generation devices (e.g., filtering devices 4) being successively disposed in between, the latter-stage gear pump final manipulation amount signal is determined in the rotational speed feedforward control unit for the latter-stage gear pump, regularly considering the latter-stage gear pump initial manipulation amount signal of the previous stage or the first-stage gear pump manipulation amount signal, the pressure control of kneaded material (resin) in each stage can be rapidly stabilized according to the flow of kneaded material (resin) from the upstream side to the downstream side.

In the feedforward control unit of each stage, the same structure as the fourth control block 50 can be adopted instead of the same structure as the third control block 40. According to this structure, also, the pressure control of kneaded material (resin) in each stage can be rapidly stabilized according to the flow of kneaded material (resin) from the upstream side to the downstream side.

What is claimed is:

1. Kneading/extruding equipment, comprising:
a raw material feeder;
an extruding machine which kneads and extrudes raw material supplied from the raw material feeder;
a first-stage gear pump for pressure-raising the kneaded material, which is provided on the downstream side of the extruding machine;
a pressure loss generation device through which the kneaded material discharged from the first-stage gear pump is passed and which causes a pressure loss in the kneaded material during the passing;
a latter-stage gear pump for pressure-raising the kneaded material discharged from the pressure loss generation device;
a first-stage variable-speed motor for driving the first-stage gear pump;
a latter-stage variable-speed motor for driving the latter-stage gear pump;
a first-stage pressure sensor for detecting a pressure of kneaded material on the inlet side of the first-stage gear pump; and
a control device which controls the rotational speed of the first-stage gear pump through the first-stage variable-speed motor and controls the rotational speed of the latter-stage gear pump through the latter-stage variable-speed motor, wherein
the control device comprises:
a rotational speed feedback control unit for the first-stage gear pump, which feedback control unit controls the rotational speed of the first-stage gear pump so that a pressure value output from the first-stage pressure sensor is conformed to a predetermined first-stage pressure set value; and
a rotational speed feedforward control unit for the latter-stage gear pump, which feedforward control unit controls the rotational speed of the latter-stage gear pump based on a signal from the rotational speed feedback control unit for the first-stage gear pump.

2. The kneading/extruding equipment according to claim 1, wherein the equipment further comprises a latter-stage pressure sensor for detecting a pressure of kneaded material on the inlet side of the latter-stage gear pump,
the control device further comprises a rotational speed feedback control unit for the latter-stage gear pump, which feedback-controls the rotational speed of the latter-stage gear pump so that a pressure value output from the latter-stage pressure sensor is conformed to a predetermined latter-stage pressure set value, and
the rotational speed of the latter-stage gear pump is controlled by combining an output of the rotational speed feedforward control unit for the latter-stage gear pump with an output of the rotational speed feedback control unit for the latter-stage gear pump.

3. The kneading/extruding equipment according to claim 1 or 2, wherein the rotational speed feedforward control unit for the latter-stage gear pump performs the control by use of a manipulation amount signal generated by the rotational speed feedback control unit for the first-stage gear pump.

4. The kneading/extruding equipment according to claim 1 or 2, wherein the rotational speed feedforward control unit for the latter-stage gear pump performs the control by use of a pressure value output from the first-stage pressure sensor.

5. The kneading/extruding equipment according to claim 1, wherein a PID control based on a deviation between the pressure value output from the first-stage pressure sensor and the predetermined first-stage pressure set value is performed in the rotational speed feedback control unit for the first-stage gear pump.

6. The kneading/extruding equipment according to claim 2, wherein a PID control based on a deviation between a pressure value output from the latter-stage pressure sensor and the predetermined latter-stage set value is performed in the rotational speed feedback control unit for the latter-stage gear pump.

7. The kneading/extruding equipment according to claim 2, wherein the equipment further comprises a third-stage gear pump provided on the downstream side of the latter stage across from a further pressure loss generation device, and the control device further comprises a rotational speed feedforward control unit for the third-stage gear pump, which controls the rotational speed of the third-stage gear pump based on a signal from the rotational speed feedback control unit for the latter-stage gear pump.

8. An operation control method of kneading/extruding equipment comprising:
   providing a raw material feeder; an extruding machine which kneads and extrudes raw material supplied from the raw material feeder; a first-stage gear pump for pressure-raising kneaded material, which is provided on the downstream side of the extruding machine; a pressure loss generation device through which the kneaded material discharged from the first-stage gear pump passes and which causes a pressure loss in the kneaded material during the passing; a latter-stage gear pump for pressure-raising the kneaded material discharged from the pressure loss generation device; a first-stage variable-speed motor for driving the first-stage gear pump; a latter-stage variable-speed motor for driving the latter-stage gear pump; a first-stage pressure sensor for detecting a pressure of kneaded material on the inlet side of the first-stage gear pump; and a control device which controls the rotational speed of the first-stage gear pump through the first-stage variable-speed motor and controls the rotational speed of the latter-stage gear pump through the latter-stage variable-speed motor;
   a step in which the control device feedback-controls the rotational speed of the first-stage gear pump so that a pressure value output from the first-stage pressure sensor is conformed to a predetermined first-stage pressure set value; and
   a step in which the control device feedforward-controls the rotational speed of the latter-stage gear pump based on a signal related to the step of feedback controlling the rotational speed of the first-stage gear pump.

9. The operation control method of kneading/extruding equipment according to claim 8, wherein
   the kneading/extruding equipment further comprises a latter-stage pressure sensor for detecting a pressure of kneaded material on the inlet side of the latter-stage gear pump, and the operation method further comprises steps of:
   feedback-controlling the rotational speed of the latter-stage gear pump so that a pressure value output from the latter-stage pressure sensor is conformed to a predetermined latter-stage pressure set value; and
   controlling the rotational speed of the latter-stage gear pump by combining an output in the rotational speed feedforward control step for the latter-stage gear pump and an output of the rotational speed feedback control step for the latter-stage gear pump.

10. The operation control method of kneading/extruding equipment according to claim 8 or 9, wherein
   in the step of feedforward-controlling the rotational speed of the latter-stage gear pump, the control is performed by use of a manipulation amount signal generated in the rotational speed feedback control step for the first-stage gear pump.

11. The operation control method of kneading/extruding equipment according to claim 8 or 9, wherein
   in the step of feedforward-controlling the rotational speed of the latter-stage gear pump, the control is performed by use of a pressure value output from the first-stage pressure sensor.

12. The operation control method of kneading/extruding equipment according to claim 8, wherein
   in the step of feedback-controlling the rotational speed of the first-stage gear pump, a PID control based on a deviation between a pressure value output from the first-stage pressure sensor and the predetermined pressure set value is performed.

13. The operation control method of kneading/extruding equipment according to claim 9, wherein
   in the step of feedback-controlling the rotational speed of the latter-stage gear pump, a PID control based on a deviation between a pressure value output from the latter-stage pressure sensor and the predetermined latter-stage pressure set value is performed.

14. The operation control method of kneading/extruding equipment according to claim 9, wherein
   the kneading/extruding equipment further comprises a third-stage gear pump provided on the downstream side of the latter stage across from a further pressure loss generation device, and
   the operation method further comprises a step in which the control device feedforward-controls the rotational speed of the third-stage gear pump based on a signal related to the step of feedback-controlling the rotational speed of the latter-stage gear pump.

* * * * *